United States Patent [19]

Poschenrieder et al.

[11] 3,794,936

[45] Feb. 26, 1974

[54] DIVIDING FILTER NETWORK FORMING AN ALL-PASS FILTER CIRCUIT

[76] Inventors: Werner Poschenrieder, Schuckertstrasse 14; Erwin Buecherl, Gabriel-Max Strasse 43, both of Munich, Germany

[22] Filed: Dec. 11, 1972

[21] Appl. No.: 313,858

Related U.S. Application Data

[63] Continuation-in-part of Ser. No. 73,879, Sept. 21, 1970, abandoned.

[30] Foreign Application Priority Data

Sept. 22, 1969 Germany.......................... 1947889

[52] U.S. Cl................. 333/28 R, 333/70 R, 333/77

[51] Int. Cl........ H03h 7/02, H03h 7/14, H04b 3/14

[58] Field of Search.... 333/6, 10, 28 R, 70 R, 73 R, 333/73 W, 77

[56] References Cited

FOREIGN PATENTS OR APPLICATIONS 772,217 4/1957 Great Britain.................... 333/70 R

*Primary Examiner*—Rudolph V. Rolinec
*Assistant Examiner*—Marvin Nussbaum
*Attorney, Agent, or Firm*—Hill, Sherman, Meroni, Gross & Simpson

[57] ABSTRACT

A dividing filter network wherein two port circuits, such as transformers, reactance circuits, equalizers and amplifiers, are interconnected in each branch of a mirror-image arrangement, the two-port circuits being designed and constructed in such a way that the frequency characteristics of the entire network agrees with the predetermined frequency characteristics of the interconnected two-port circuits, except for an additional phase.

7 Claims, 8 Drawing Figures

INVENTORS
Werner Poschenrieder
Erwin Buecherl

BY Hill, Sherman, Meroni, Gross & Simpson ATTYS.

DIVIDING FILTER NETWORK FORMING AN ALL-PASS FILTER CIRCUIT

CROSS REFERENCE TO RELATED APPLICATION

This is a continuation-in-part of Ser. No. 73,879, filed Sept. 21, 1970, now abandoned.

BACKGROUND OF THE INVENTION

1. Field of the Invention

The invention relates to a dividing filter network consisting of an all-pass filter circuit which comprises two equal frequency filters connected with the sub-filters thereof in cascade in a mirror-image arrangement, whose sub-filters have been characteristic functions reciprocal to one another of degrees $2n$ ($n = 1, 2, 3 \ldots$).

2. Description of the Prior Art

In communications transmission technology, especially in the construction of wide-band carrier-frequency systems, such as for example in the case of video systems, there frequently arises the problem of transmitting relatively wide frequency bands. As is well known, however, the circuits used, such as for example active four-pole circuits, transformers and other four-pole circuits have limited bandwidths, so that in the transmission of such wide frequency bands large, undesirable, deviations from the desired behavior can occur such as for example intolerable attenuation distortions. In order to circumvent such difficulties in the design and construction of four-pole circuits, there must then be considered the subdividing of a broad transmission frequency band into two or more sub-frequency bands and transmitting these sub-frequency bands on separate paths, if it would be possible to rejoin the separately transmitted frequency bands in correct phase and correct amplitude. In particular, in this manner it would be possible to achieve a substantial reduction of the demands on the requisite transmission four-pole circuits, such as for example wide-band transformers or wide band amplifiers. In the periodical "De Ingenieur", vol. 76, no. 35, Aug. 28, 1964, in the article extending over pages 121 to 126, especially on pages 122 and 123, a circuit with parallel-connected transformers is mentioned. This circuit amounts to a dimensioning of one of the transformers for the lower part of the total frequency band and the other of the transformers for the high part of the total frequency band. The transformers are there supplemented by parallel-connected low and high-pass filters. As is stated in the literature passage indicated, in the dimensioning of such a circuit obviously provides no solution for the problem, because in the transition zone between the filters the arrangement is dependent on signal level and frequency, which facts are expressed by a wavy characteristic.

SUMMARY OF THE INVENTION

Underlying the invention is the problem of obviating the aforementioned difficulties; in particular, the construction of a dividing filter network is to be provided which makes possible, in its total configuration, the splitting up and thereafter a gap-free putting-together again in-phase and in-amplitude of arbitrarily wide frequency bands.

Proceeding from a dividing filter network consisting of an all-pass circuit which consists of two equal dividing filters with their subfilters connected in cascade in a mirror-image pattern, whose sub-filters have even characteristic functions, reciprocal to one another, of the degree $2n$ ($n = 1, 2, 3 \ldots$), this problem is solved, according to the invention, in that between each two equal sub-filters there are connected two-port networks constructed as transformers, reactance networks, equalizers or amplifiers. These two-port circuits are dimentioned in such a way that the electrical properties of the entire filter network, except for one addition phase, agree with the electrical properties provided in the sub-frequency ranges of the interposed two-port networks.

BRIEF DESCRIPTION OF THE DRAWINGS

The invention will be best understood from the following detailed description taken in conjunction with the accompanying drawings, on which.

DESCRIPTION OF THE PREFERRED EMBODIMENTS

Figure 1:
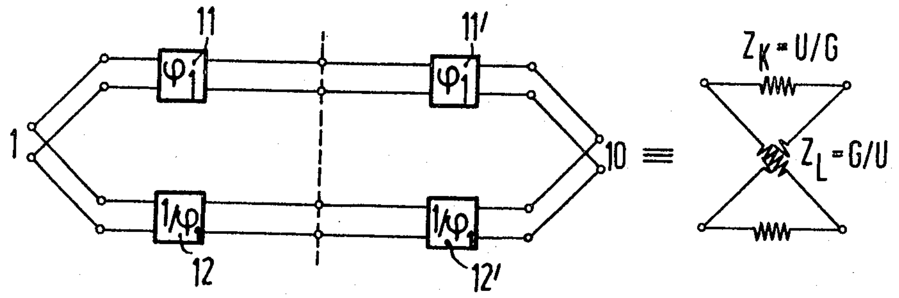
FIG. 1 is a schematic block diagram of an all pass network formed by the connection of two separating filters in a mirror-image arrangement.

Through German patent 1,268,289 there has already become known an all-pass circuit, which is taken as point of departure in the present invention and whose basic concept, for better understanding, should be briefly explained with the aid of FIG. 1.

The all-pass circuit, whose input terminals are designated with reference numbers 1 and 10, consists of a cascade circuit of two equal exact dividing networks, whose sub-filters are identified with the reference numbers 11 and 12 and 11' and 12', respectively. The individual subfilters have even characteristic functions of the degree $2n$, where $n = 1, 2, 3 \ldots$, and, in particular, the sub-filters 11, 11' connected in each case in cascade have the same characteristic function $\phi_1(p)$ and the sub-filters 12 and 12' have the same characteristic function $\phi_2(p) = 1/\phi_1(p)$, in which $p$ in known manner signifies a complex frequency variable. For the sake of a simpler manner of writing, the characteristic functions are designated in the following merely with $\phi_1$ and $\phi_2$.

As has already been shown in the aforementioned German patent 1,268,289, the cascade circuit of two equal exact dividing filters with even characteristic functions $\phi_1$ and $\phi_2 = 1/\phi_1$ provides an exact all-pass circuit. To the characteristic functions $\phi_1 = h/f$ and $\phi_2 = f/h$ of the sub-filters there are allocated the transfer functions of $N_1 = e^{gN1} = -g/f$ and $N_2 = e^{gN2} = -g/h$, in which the numerator polynominal $g = G+U$, where the even part $G$ and the odd part $U$ constitute a Hurwitz polynominal. By the even and odd parts of the Hurwitz polynominal g there are determined the primary open circuit impedance $$Z_L = G/U \qquad (1)$$

and the primary short-circuit impedance $$Z_k = U/G \qquad (2)$$

which are reciprocals on one another. According to the Barlett theorem there is obtained from this relationship for the equivalent lattice network represented in FIG. 1, the transfer function ($S(P)$ of the circuit according to FIG. 1

$$S(P) = [G(p) + U(p)]/[G(p) - U(p)] = g(p)\ /g\ (-p) = e^{jb(}p)$$

with the amplitude $|S(p)| = 1$ and the phase $b(p)$.

Thereby it is possible to separate and rejoin frequency bands, and more specifically, to rejoin the bands in such a way that with loss-free observation no attenuation distortions of any kind occur since the entire arrangement is equivalent to an all-pass circuit.

It can be shown that these known circuits do not alter the transmission behavior of two equal arbitrary two-port circuits interconnected in each case between two sub-filters of the dividing filters, except for an additional phase. This principle is still true with great accuracy even if the interconnected two-port circuits have differing properties in wide frequency ranges, if only their transmission bands overlap in the overlappping zone of the dividing filters and there have equal properties, and if, in the frequency ranges in which the transmission properties of the interposed two-port circuits VP1 and VP2 (cf. FIG. 2) are different, the sub-filters in each case have a high attenuation corresponding to the required accuracy. In other words, this means that if the properties of the four-pole circuit (two-port circuit) VP1 are to be determinative, the properties of the four-pole circuit VP2 have to be suppressed by a corresponding high attenuation of the partial filters 12 and 12' and vice versa.

It is possible to connect into the subdivided frequency band amplifiers of transformers of other passive networks which have to be dimensioned only from the sub-bands and, if need be, in the overlapping range. The special feature of this circuit is to be seen in that the subfrequency bands are combined again in correct amplitide and in phase, since the whole system corresponds to the cascade circuit of an all-pass and the interposed two-port circuits transmission band of the entire system is composed without gaps of the transmission bands of the inserted two-port circuits.

Figure 2:
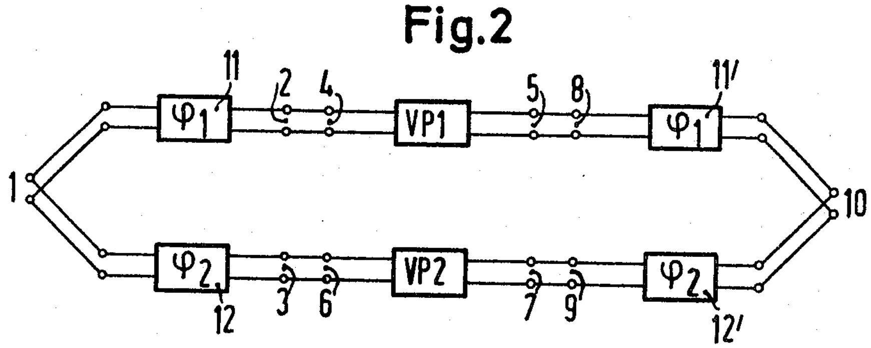
FIG. 2 is a schematic block diagram of the apparatus of FIG. 1 with interconnected two-port networks in each circuit branch.

According to the invention, as shown in FIG. 2, between each two equal sub-filters there is connected a four-pole circuit constructed as a transformer, reactance network, equalizer or amplifier i.e., the four-pole circuit VP1 is connected between the partial filters 11 and 11' and the four-pole circuit VP2 is connected between the partial filters 12 and 12'. The dimensioning of these four-pole circuits is selected in such a way that the electrical properties of the entire dividing filter network, therefore the electrical properties between the input and output terminals 1 and 10, except for an additional phase $b$, agree with the electrical properties predetermined in the particular sub-frequency ranges of the interposed four-pole circuits VP1 and VP2.

In the following the theoretical relationships of the whole circuit are explained in more detail on the basis of FIG. 2.

Between the two three-port circuits 1, 2, 3 and 8, 9, 10 the differing four-pole circuits VP1 and VP2 (for example all-pass circuits, amplifiers, transformers) are respectively connected and the transmission properties of the resulting four-pole circuit from references 1 and 10 are investigated. There, the following assumptions hold.

The four-pole circuits VP1 and VP2 are defined by the scattering matrices $$||S_1|| = \left\|\begin{matrix} r_4 & e^{-g1r} \\ e^{-g1v} & r_5 \end{matrix}\right\| \text{ and } ||S_2|| = \left\|\begin{matrix} r_6 & e^{-g2r} \\ e^{-g2v} & r_7 \end{matrix}\right\| \qquad (4, 5)$$

in which $r_4$ to $r_7$ are the reflection factors allocated to the corresponding terminal pairs against a real reference resistance and $g_{1v}$, $g_{2v}$ and $g_{1r}$, $g_{2r}$ are the forward and backward transfer constants between the real reference resistances. The properties of the dividing filters are determined by the scattering matrix.

$$||S|| = \left\|\begin{matrix} 0 & e^{-gN1} & e^{-gN2} \\ e^{-gN1} & -e^{-2gN2} & e^{-(gN1+gN2)} \\ e^{-gN2} & e^{-(gN1+gN2)} & -e^{-2gN1} \end{matrix}\right\| \qquad (6)$$

There $g_{N1}$ and $g_{N2}$ are voltage transfer constants of the sub-filters beloning to the $\phi_1$ and $\phi_2$.

Figure 3:
FIG. 3 is a schematic block diagram of a network equivalent to that shown in FIG. 2.

For the special case of equal reciprocal four-pole circuits VP1=VP2=VP with $g_{1v}=g_{1r}=g_{2v}=g_{2r}=g$ and finite reflection factors $r_4=r_6 \neq 0$ and $r_5=r_7 \neq 0$, it can be shown that circuits according to FIG. 2 are strictly equivalent to the four-pole circuit VP with a pre-connected and after-connected all-pass circuit of the phase $b/2$, as is represented in FIG. 3. The parameters of the scattering matrix $S^+$ of the total circuit designated by "+" receive the following form:

$$S^+_1 = r_4 e^- jb \qquad (7)$$

$$S^+_{10} = r_5 e^+ jb \qquad (8)$$

$$S^+_{10,1} = e^- g e^- jb \qquad (9)$$

$$S^+_{1,10} = e^- g e^- jb \qquad (10)$$

$$||S^+|| = \left\|\begin{matrix} S_1^+ & S^+_{1,10} \\ S^+_{10,1} & S_{10}^+ \end{matrix}\right\|$$

The corresponding statements hold for equal amplifiers VP1=VP2=VP in which $g_{1v}=g_{2v}=g$, but $e^- g1r = e^- 2gr = 0$. In this case, in deviation from equation (10)

$$S^+_{1,10} = 0 \qquad (11)$$

For the important case of unequal amplifiers $g_{1v} \neq g_{2v}$ the elements are derived from the scattering matrix with finite reflection factors $r_4 \ldots r_7 \neq 0$, but under the restricting assumption that $e^- glr = e^- g2r = 0$. The calculation yields the following results: Reflection factor at the input terminals 1

$$S^{+}_{1} = (r_4 e^{-2gN1} + r_6 e^{-2gN2} + r_4 r_6 e^{-2jb}) / (1 + r_4 e^{-2gN2} + r_6 e^{-2gN1}) \quad (12)$$

Reflection factor at the output terminals 10 $S^{+}_{10} = (r_5 e^{-2gN1} + r_7 e^{-2gN2} 30\ r_5 r_7 e^{-2jb}) / (1 + r_5 e^{-2gN2} + r_7 e^{-2gN1})$ (13)

Reciprocal forward transfer function $$S^{+}_{10,1} = \frac{e^{-g1v} e^{-2gN1}(1 + r_6 e^{-jb})(1 + r_7 e^{-jb})}{(1 + r_4 e^{-2gN2} + r_6 e^{-2gN1})(1 + r_5 e^{-2gN2} + r_7 e^{-2gN1})} + \frac{e^{-g2v} e^{-2gN2}(1 + r_4 e^{-jb})(1 + r_5 e^{-jb})}{(1 + r_4 e^{-2gN2} + r_6 e^{-2gN1})(1 + r_5 e^{-2gN2} + r_7 e^{-2gN1})} \quad (14)$$

Reciprocal backward transfer function $S^{+}_{1,10} = 0$

If the above-defined amplifiers VP1 and VP2 have differing transmission bands bordering on one another—as is the case in practical utilization—then the circuit according to FIG. 2, depending on the magnitude of the stop band attenuation of the sub-filters, shows within the sub-bands a behavior corresponding with great accuracy to equations (7), (8), (9) and (11). If the overlapping zone of the separating filters there is to take place a continuous transmission transition of the operating attenuation, determined exclusively by the four-pole circuits VP1 and VP1, then in this zone the transmission bands of the four-pole circuits VP1 and VP2 must overlap and have equal properties with respect to amplitude and phase. Attenuation and/or phase can always be corrected by a cascade circuit of an attenuation equalizer and/or of an all-pass circuit to one of the two four-pole circuits VP1, VP2 in the required manner.

In the low-pass transmission range of the separating filter all-pass circuit the following expression holds:

$$|e^{-gN1}| \approx 1 \text{ and } |e^{-gN2}| \approx 0 \quad (16,17)$$

If the approximations (16, 17) are substituted in equation (14) then there is obtained, on the assumption of small reflection factors $r_4 \ldots r_7$, the expression:

$$S^{+}_{10,1} \approx \frac{e^{-g1v} e^{-2gN1}[1 + e^{-jb}(r_6 + r_7)]}{1 + e^{-2gN1}(r_6 + r_7)} \approx e^{-g1v} e^{-2gN1} \approx e^{-g1v} e^{-j2bN1} \approx e^{-g1v} e^{-jb}, \quad (18)$$

since $e^{-2aN1} . e^{-j2bN1} \approx e{-j2bN1}$ and because of the blocked high-pass path $e^{-j2bN1} \approx e^{-jb}$. In the high pass range of the dividing filter all-pass circuit $e^{-gN2} \approx 1$ and $e^{-gN1}$ $9 \approx 0$. The following relation is therefore provided:

$$S^{+}_{10,1} \approx e^{-g2v} e^{-j2bN2} \approx e^{-g2V} e^{-jb} \quad (19)$$

since in this range the phase $b$ of the dividing filter all-pass circuit, because of the blocked low-pass path, is identical with the high-pass phase $2b_{N2}$.

In the overlapping range, according to the assumption $g_{1v} = g_{2v} = g_v$, equation (14) brings in view of the relation $e^{-2gN1} + e^{-2gN2} = h^2 + f^2/g^2 = G^2 - U^2 1(G + U)^2 = G - U/(G + U) = e^{-JB}$ and the assumption of small reflection factors $r_4 \ldots r_7$:

$$S^{+}_{10,1} \approx e^{-gv} \left[ \frac{e^{-2gN1} + e^{-2gN2} + e^{-2gN1} e^{-jb}(r_6 + r_7)}{1 + e^{-2gN1}(r_6 + r_7) + e^{-2gN2}(r_4 + r_5)} + \frac{+ e^{-2gN2} e^{-jb}(r_4 + r_5)}{1 + e^{-2gN1}(r_6 + r_7) + e^{-2gN2}(r_4 + r_5)} \right] \approx e^{-gv} . e^{-jb}. \quad (20)$$

The reflection factors are approximately determined by the following equations:

$$S^{+}_{1} \approx r_4\, e^{-2gN1} + r_6 e^{-2gN2} \quad (21)$$

$$S^{+}_{10} \approx r_5 \cdot e^{-2gN1} + r_7 e^{-2gN2}. \quad (22)$$

In the numerators of the equations (21) and (22) terms of second order are neglected, and in the denominator (with respect to 1) terms of first order are neglected; in equations (18) to (20) in the numerator and in the denominator only terms of second order are neglected.

These results can be transferred directly to filter groups for dividing a transmission band into several partial bands. Since in this case a strict dividing filter solution at an expenditure that is warranted is no longer possible, phase errors possibly arising in the overlapping zones are to be corrected by all-pass circuits.

Figure 4:
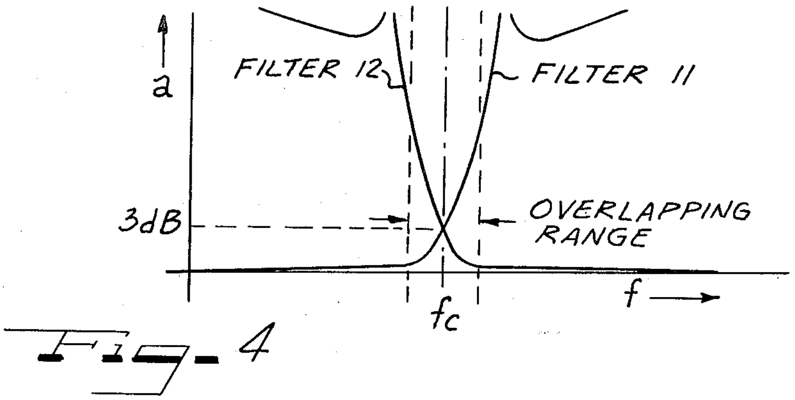
FIG. 4 is a graphic illustration of the attenuation of a dividing filter according to FIG. 1.

FIG. 4 illustrates in principle the attenuation of a dividing filter according to FIG. 1 wherein a low pass filter is employed for the filters 11, 11', and a high pass filter is employed for the filters 12, 12'. The 3dB base frequency $f_c$ (cut off frequency) has also been indicated and is positioned in the overlapping range of the actual attenuation curve. As it will be explained below with the help of FIG. 8, the subfilters 11 and 12 have a respective attenuation pole in their blocking ranges.

Figure 5:
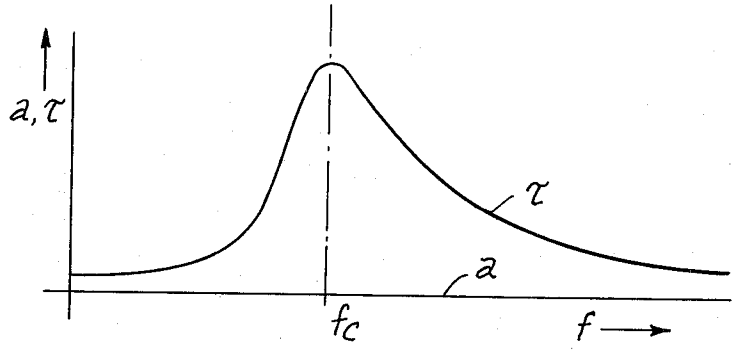
FIG. 5 is a graphic illustration of the attenuation and delay characteristics of a dividing filter all-pass network of FIG. 1.

In FIG. 5, the attenuation a and the group delay time $\tau$ is illustrated and depends on the frequency of a dividing all-pass network according to FIG. 1. The attenuation a is zero ($a = 0$), since the circuit according to FIG. 1 is a strict all pass network. Referring to the equations (1) to (3), $|S(p)| = 1$, i.e. $ln\ |S(p)| = a = 0$. As opposed thereto, however, the phase $b$ or the group delay time $\tau = db/d\omega$, respectively, is frequency dependent.

Figure 6:
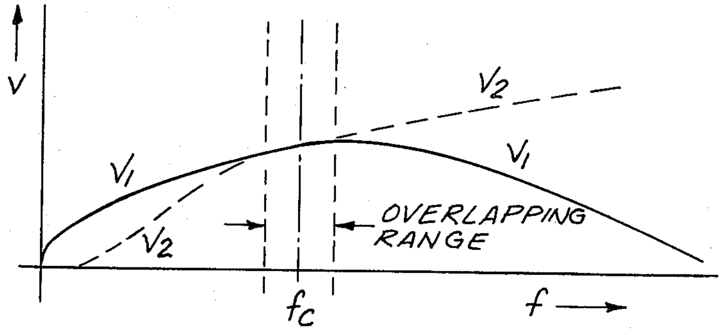
FIG. 6 is a graphic illustration of the gain of the circuits VP1 and VP2 of FIG. 2.

FIG. 6 illustrates curves for the mathematical relationships which have been derived from the equations (11) through (22). According to FIG. 2, an amplifier with the frequency dependent amplification $v_1$ (gain) is inserted as the quadrupole VP1 in the dividing filter all pass network, and, as the quadrupole VP2 an amplifier with the amplification $v_2$, which is different from $v_1$ is utilized. (Here compare the information following equation (11) relating to $g_{1v} \neq g_{2v}$.) In the overlapping range the amplifiers VP1 and VP2 have equal amplification as set forth following equation (19) where $g_{1v} = g_{2v} = g_v$. For a more simple overall view, only the amplification has been illustrated in FIG. 6 and not the phases of the connected amplifiers. Correspondingly, the same is true for the phases. From FIG. 7, the amplifications v of the entire network has been illustrated with respect to the frequency $f$. This result is obtained when individual partial amounts from equation (18), equation (19) and equation (20) are combined.

Figure 7:
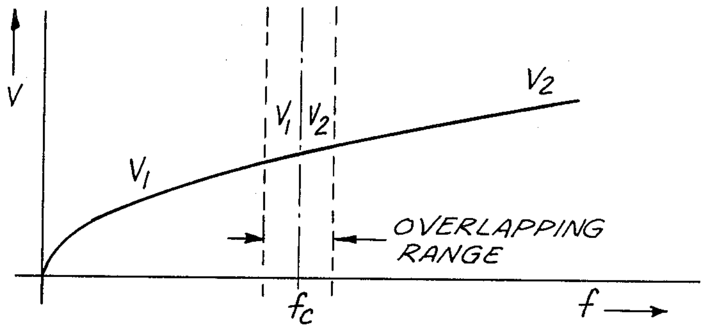
FIG. 7 is a graphic illustration of the gain of the entire network of FIG. 2.
Figure 8:
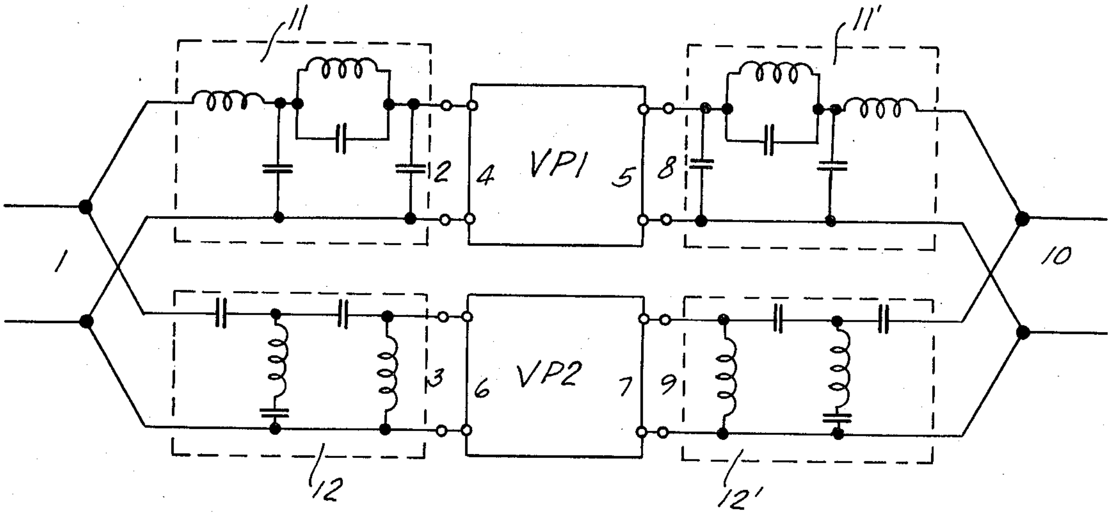
FIG. 8 is a schematic diagram of a specific network configuration for a wideband amplifier having the gain illustrated in FIG. 7 and a fourth order dividing all-pass network.

FIG. 8 illustrates a particular network, the reference numerals of the terminals (1–10) and the sub-filters (11, 11', 12,12') coincide directly with those in FIG. 2. This network supplies the entire amplification between the terminals 1 and 10, as is illustrated in FIG. 7. The individual amplifiers VP1 and VP2 supply the partial amplification $v_1$ and $v_2$ between the terminals 4 and 5, or between the terminals 6 and 7, respectively, which have been illustrated in FIG. 6. The two-ports VP1 and VP2, respectively, must have equal properties in the overlapping range, which, in itself, is a limiting condition. Therefore, the smaller the overlapping range is selected, the smaller is the effect of this condition; this is obtained, for instance, by means of inserting attenuation poles into the blocking range of the filters. In this case, the attenuation poles are realized by the parallel resonant circuits, for example, which are in the longitudinal branch of the network for the low pass filters 11 and 11', and for the high pass filters 12 and 12' by the series resonant circuits which are in the transverse branch of the network.

One skilled in the art will appreciate that each of the circuit components described above which may be utilized in practicing the invention are readily available in the art. For example, one may advantageously refer to the article "On The Design of Filters by Synthesis", by Saal and Ulbrich in the periodical IRE Transactions on Circuit Theory, volume CT–5, number 4, Dec. 9, 1958, pp. 284–327, to Louis Weinberg, Network Synthesis, McGraw-Hill Book Company, Inc. 1962 and to Norton U.S. Pat. No. 2,076,248 among the many publications in the field.

In the use of the described principle in connection with wide-band amplifiers the following advantages among others, will be realized: The bandwidth requirements and the linearity requirements of the individual amplifiers can be lowered. Further, through separation of the frequency bands a pre-equilizer can be avoided and thereby thermal noise can be reduced, since the signals at lower frequencies do not have to be lowered further.

Although we have described our invention by reference to specific illustrative embodiments, many changes and modifications may be apparent to those skilled in the art without departing from the spirit and scope of our invention. We therefore intend to include within the patent warranted hereon all such changes and modifications as may be resonably and properly included within the scope of our contribution to the art.

We claim:

1. In a dividing filter network circuit arrangement forming an all-pass circuit by connecting two equal dividing filters in a mirror-image arrangement the dividing filters including sub-filters which have even characteristic functions, reciprocal to one another, of the degree $2n$ ($n$=1,2,3. . . ), the improvement therein comprising between each two equal sub-filters there are interposed respective two port circuits having in general different frequency characteristics in partial frequency ranges, which two-port circuits are dimensioned in such a way that the electrical properties of the entire filter network agree with predetermined electrical properties in the partial frequency ranges of the interposed two-port circuits, except for an additional phase.

2. A separating filter network according to claim 1, wherein the interposed two-port circuits are active two-port circuits with different transmission frequency bands, said active two-port circuits being dimensioned in such a way that their transmission frequency bands overlap in an overlapping range of the sub-filters and in such overlap have equal properties, and in the frequency ranges in which the transmission properties of the imposed two-port circuits are different the sub-filters respectively have a high stop band attenuation corresponding to the required accuracy of the frequency behavior of the entire circuit.

3. A filter network according to claim 1, wherein the interposed two-port circuits are passive two-port circuits with differing transmission frequency bands, said two-port circuits being dimensioned in such a way that their transmission frequency bands overlap in an overlapping range of the sub-filters and in such overlap have equal properties, and in the frequency ranges in which the transmission properties of the interposed two-port circuits are different the sub-filters respectively have a high stop band attenuation corresponding to the required accuracy of the frequency behavior of the entire circuit.

4. A filter network according to claim 1, wherein said two-port circuits are transformers.

5. A filter network according to claim 1, wherein said two-port circuits are reactance circuits.

6. A filter network according to claim 1, wherein said two-port circuits are attenuation equalizer circuits.

7. A filter network according to claim 1, wherein said two-port circuits are amplifier circuits.

* * * * *